United States Patent [19]

Kutsuna et al.

[11] Patent Number: 5,203,991
[45] Date of Patent: Apr. 20, 1993

[54] PACKING MATERIAL FOR LIQUID CHROMATOGRAPHY

[75] Inventors: Hiroshi Kutsuna; Yoshihiro Shiojima; Tsuneo Suhara; Hiroshi Fukui; Yutaka Ohtsu; Michihiro Yamaguchi, all of Yokohama, Japan

[73] Assignee: Shiseido Company, Ltd., Tokyo, Japan

[21] Appl. No.: 778,357

[22] Filed: Oct. 17, 1991

[30] Foreign Application Priority Data

Oct. 31, 1990 [JP] Japan .................................. 2-291695

[51] Int. Cl.$^5$ ............................................. B01D 15/08
[52] U.S. Cl. .............................. 210/198.2; 210/502.1; 210/635; 210/656; 502/401; 502/402
[58] Field of Search ............. 210/635, 656, 198.2, 210/502.1; 502/401, 402; 55/386

[56] References Cited

U.S. PATENT DOCUMENTS

| | | | |
|---|---|---|---|
| 3,975,293 | 8/1976 | LePage | 210/635 |
| 4,268,419 | 5/1981 | Rohrbach | 502/401 |
| 4,268,423 | 5/1981 | Rohrbach | 502/401 |
| 4,517,241 | 5/1985 | Alpert | 210/635 |
| 4,694,044 | 9/1987 | Kiniwa | 210/635 |
| 4,913,812 | 4/1990 | Moriguchi | 210/635 |
| 5,071,819 | 12/1991 | Tarbet | 502/401 |
| 5,084,430 | 1/1992 | Tarbet | 502/401 |
| 5,135,649 | 8/1992 | Kanda | 210/502.1 |

FOREIGN PATENT DOCUMENTS 63-171678 7/1988 Japan ........................... 210/198.2

OTHER PUBLICATIONS

PTO-92-2868-A Translation of Kokai No. 63-171678 Aug. 1992 pp. 1-76.

Primary Examiner—Ernest G. Therkorn
Attorney, Agent, or Firm—Wegner, Cantor, Mueller & Player

[57] ABSTRACT

A packing material for liquid chromatography bears a polyalkylene polyamine moiety linked through a spacer moiety as the pendant group to a porous silica gel coated with a silicone polymer, and optionally is crosslinked by a crosslinking agent on two or more amino group of the different polyalkylene polyamine moieties, and a process for production thereof. Such a packing material is especially useful in the analysis of sugars.

9 Claims, 4 Drawing Sheets

PACKING MATERIAL FOR LIQUID CHROMATOGRAPHY

BACKGROUND OF THE INVENTION

1. Field of the Invention

The present invention relates to a packing material for liquid chromatography having a polyalkylene polyamine moiety linked through a spacer moiety as the pendant group to a porous silica gel coated with a silicone polymer and a process for production thereof.

2. Description Relative to the Prior Art

Liquid chromatography has been widely used for isolation and analysis of useful components from a natural product itself, production and working researches of various organic materials and isolation and analysis of a variety of compounds produced in those industries.

For example, a certain kind of liquid chromatography is suitable for the analysis of sugars, and for the analysis of these there have been employed, as the packing material, cation exchange resins comprising polystyrene gel possessing sulfonic acid groups (e.g., see Japanese Unexamined Patent Publication (Kokai) No. 59-162953), polystyrene resins possessing quaternary ammonium groups, silica gels having aminopropyl groups introduced therein (e.g., see Koizumi et al., Denpun Kagaku (Starch Science), 34, page 308 (87)) and ion exchangers having amino groups disclosed in Japanese Unexamined Patent Publication (Kokai) No. 60-150839.

All of the liquid chromatographies using these packing materials, although a separation ability to some extent may be expected, are not so satisfactory with respect to durability, elution conditions (e.g., the gradient method), etc. For example, the packing material such as silica type $NH_2$ and polysaccharide having amino groups have some shortcoming, (1) poor in stability to hydrolysis, (2) the useable pH range is limited from 2 to 7, (3) the remaining adsorbed sample cannot be washed with an alkali, and the like.

The present invention is intended to provide a packing material for liquid chromatography which solves the problems of durability, handling and separation characteristics inherent in the prior art, and is particularly excellent in alkali resistance and separation characteristics.

The present inventors, particularly as a means for modifying the surface of inorganic solid particles excellent in physical strength to thereby impart stability of the organic residual groups derived to various chemical conditions, have proposed a method for coating the surface of those particles with a silicone polymer. Also, we successfully imparted a further function to the inorganic solid particles coated with the silicone polymer by utilizing the reactive groups of such coated silicone polymer, and reported publicly (see Japanese Unexamined Patent Publication (Kokai) No. 63-171678). These functional particles include many particles which can themselves be used as the packing material for liquid chromatography and can desolve aforesaid problems. However, as the result of further studies to develop a packing material having additional specific separation ability, present inventors are found that a packing material having a polyalkylene polyamine bonded, through a spacer with a certain chain length, to particles coated with a specific silicone polymer exhibits excellent separation characteristics particularly to sugars, etc., while retaining good stability, and then accomplished the present invention.

SUMMARY OF THE INVENTION

According to the present invention, there is provided a packing material for liquid chromatography, comprising a moiety derived from a porous silica gel coated with a silicone polymer containing a SiH group, a spacer moiety and a polyalkylene polyamine moiety, wherein (A) the silicon atom derived from the SiH group of the aforesaid silica gel moiety is a silicon-carbon covalently bonded to one end of the spacer moiety, and the other end of the spacer moiety is carbon-nitrogen or sulfur-nitrogen covalently bonded to the amino group of the polyalkylene polyamine; and (B) the spacer constituting portion between said both bonds is a group having 3 to 15 constituent atoms of a main chain, and comprises a substituted or unsubstituted hydrocarbon chain which is or is not interrupted with at least one oxygen atom, sulfur atom or nitrogen atom, and further a packing material with the amino groups mutually between the polyalkylene polyamine moieties being crosslinked.

Also, the present invention provides a method for producing the aforesaid packing material comprising the step of (a) reacting preferentially the Si—H group of the porous silica gel coated with a silicone polymer containing a Si—H group with the vinyl group of a spacer compound having a vinyl group and an epoxy group, a reactive carboxyl group, a reactive sulfonyl group or a halogen atom; and the step of (b) reacting a polyalkylene polyamine with another functional group of the spacer compound covalently bonded to the silicon atom of the aforesaid SiH group in the preceding step (a), and further if necessary the step of crosslinking the amino groups mutually between the polyalkylene polyamine moieties.

Figure 1:
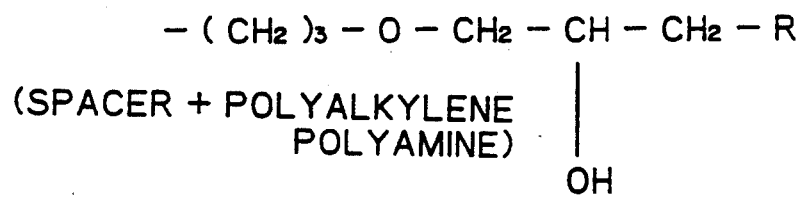
FIG. 1, FIG. 2 and FIG. 3 are chromatograms showing the elution patterns of sugars by use of the packing material of the present invention.
Figure 1:
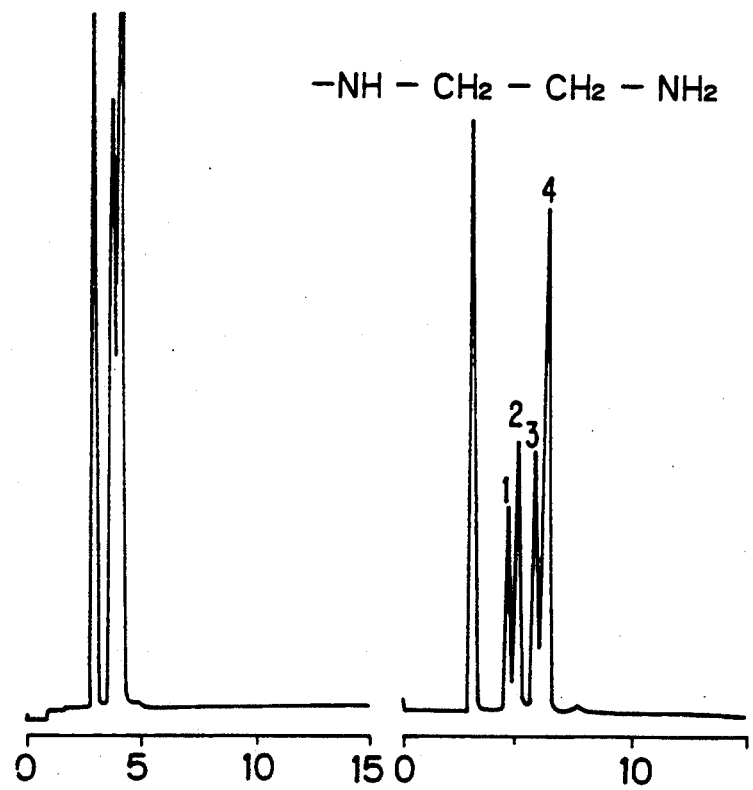
Figure 2:
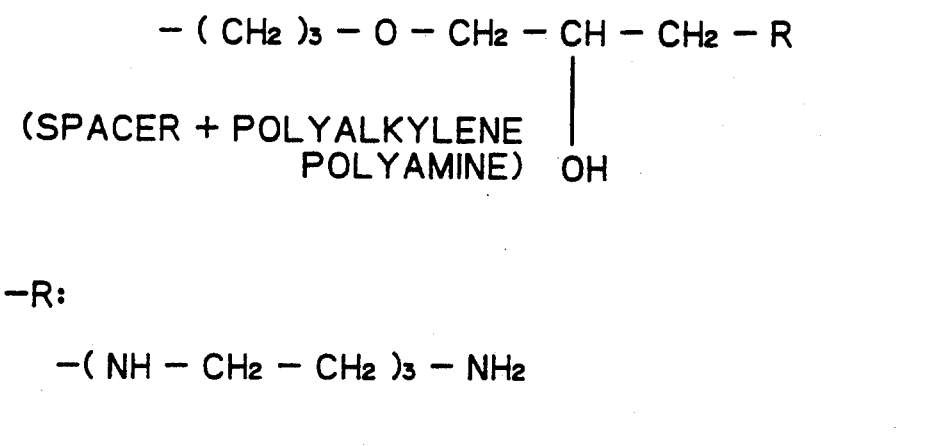
Figure 2:
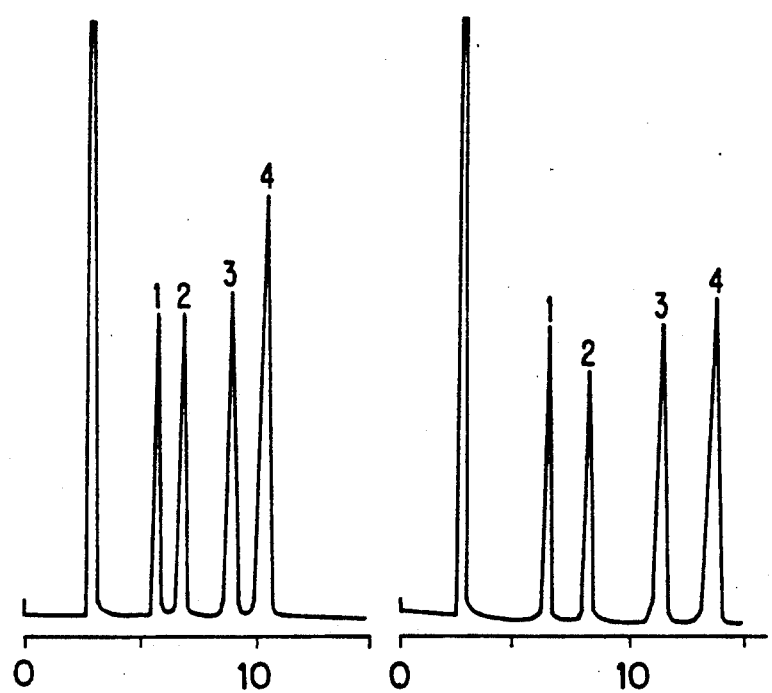
Figure 3:
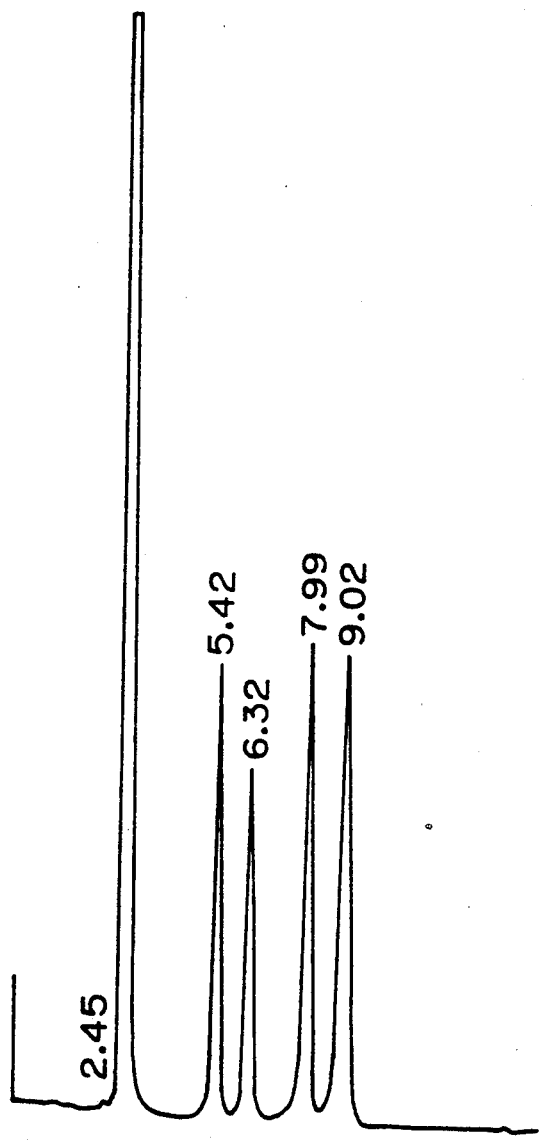

As to the numerals in FIG. 1, FIG. 2 and FIG. 3, 1 indicates the elution peak of fructose, 2 glucose, 3 saccharose and 4 maltose, respectively.

Figure 4:
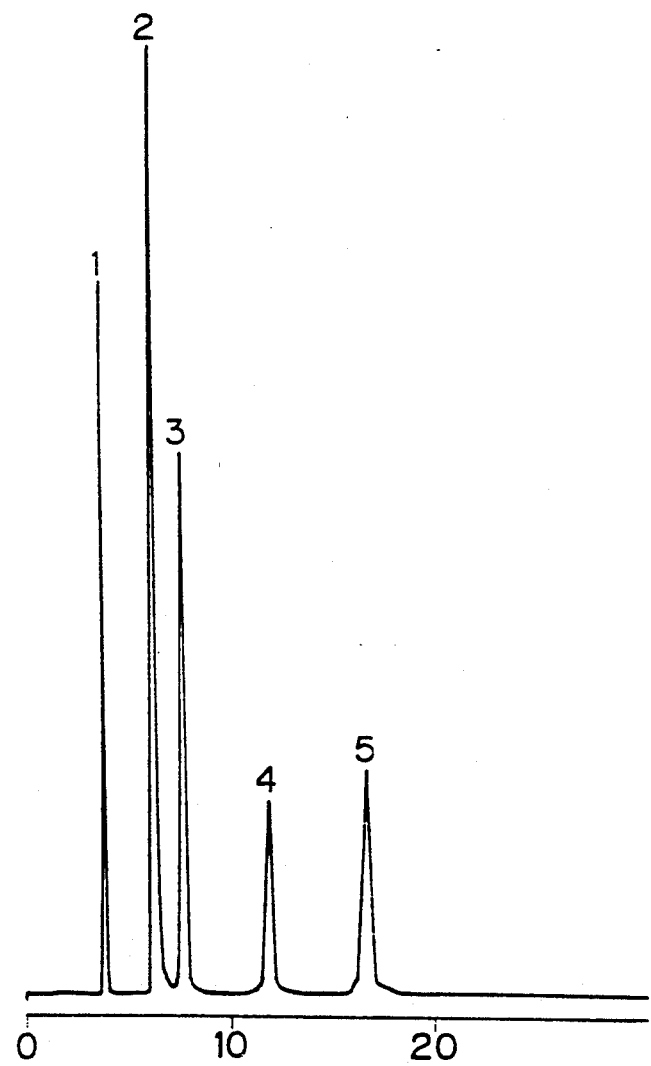
FIG. 4 is a chromatogram showing the elution pattern of nucleotides by use of the packing material of the present invention.

As to the numerals in FIG. 4, 1 indicates the elution peak of 5'-CMP, 2:5'-AMP, 3:5'-UMP, 4:5'-IMP, and 5:5'-GMP, respectively.

DETAILED DESCRIPTION OF THE INVENTION

The porous silica gel coated with a silicone polymer containing a SiH group to be used in the present invention is known per se, and may include those specifically described in Japanese Unexamined Patent Publication (Kokai) No. 63-171678 according to the proposal by the present inventors. Among these, provided that it can be used as the packing material for liquid chromatography, its shape and dimensions are not limited, but generally, one which is spherical and has an average diameter of 0.5 $\mu$ to 100 $\mu$, preferably 2 $\mu$ to 10 $\mu$ is preferred. The porous silica gel may have pore sizes in the range of 30 to 2000 Å. For analysis of monosaccharides, oligosaccharides or nucleotides, pore sizes of 40 to 300 A are particularly preferable. On the other hand, for analysis of those with large molecular weights such as polysaccharides, glycoproteins, proteins, etc., pore sizes of 120 to 500 A are preferable, and when rapid analysis of these substances to be analyzed is aimed at, those with no fine pore are also suitable. As for the silicone polymer to be coated, its coating method and the kind of the polymer are not limited, but preferably one prepared by depositing a silicone monomer or oligomer which is the precursor of the silicone polymer in a gas phase under heating conditions on the silica gel surface and forming a uniform silicone coating by contact polymerization on its surface. As specific examples of a silicone monomer or oligomer convenient for such deposition may include the following formula (I), (II) or (III):

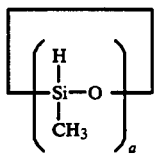
(I)

(a = 3 − 7),

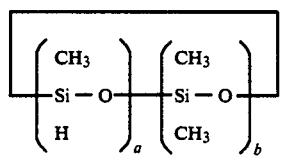
(II)

(a > 0, a + b = 3 − 7)

or

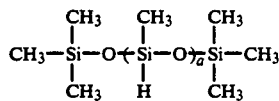
(III)

(a = 2 − 5)

including cyclic silicone compounds such as dihydrogen hexamethylcyclotetrasiloxane, trihydrogen pentamethylcyclotetrasiloxane, tetrahydrogen tetramethylcyclotetrasiloxane, dihydrogen octamethylcyclopentasiloxane, trihydrogen heptamethylcyclopentasiloxane, tetrahydrogen hexamethylcyclopentasiloxane and pentahydrogen pentamethylcyclopentasiloxane and the like; and linear silicone compounds such as 1,1,1,3,5,7,7,7-octamethyltetrasiloxane, 1,1,1,3,5,7,9,9,9-nonamethylpentasiloxane, and 1,1,1,3,5,7,9,11,11,11-decamethylhexasiloxane and the like. As to the details of these silicone compounds, by gas phase deposition, contact polymerization thereof on the silica gel surface shown in the above-mentioned Publication No. 60-150839, a silicone polymer coating deposited on the silica gel surface can be formed. The polymer has a reactive hydrosil (Si—H) group as can be understood from the formula of its corresponding monomer. Therefore, the moiety derived from the porous silica gel coated with a silicone polymer containing a SiH group refers to one in which at least one of the Si—H groups contained in the above silica gel coated with the silicone polymer has become Si—.

The spacer moiety of the present invention is a linking group with the spacer constituting portion comprising 3 to 15 constituent atoms of a main chain, and the main chain of these comprises a substituted or unsubstituted hydrocarbon chain which may also be interrupted with at least one oxygen atom, sulfur atom or nitrogen atom, and preferably a spacer moiety comprising a substituted or unsubstituted hydrocarbon chain which may also be interrupted with an oxygen atom. Representatives of the substituent are $C_{1-18}$ alkyls, hydroxy alkyls, oxy group, halogen atoms, hydroxyl group, etc., and other substituents may include those described in the above Japanese Unexamined Patent Publication (Kokai) No. 63-171678, and one or more of these can be contained. The hydrocarbon chain is alkylene, alkenylene, arylene, alkylene-arylene, dialkylenearyl, and the terminal end covalently bonded to the polyalkylene polyamine may also have a moiety derived from the functional group suitable to such bonding. As the chain interrupted with an oxygen atom, sulfur atom or nitrogen atom, those having either one of the above atoms internally of these hydrocarbon chains, and forming ether, thioether, or amine chains corresponding to the respective atoms may be included. The starting material for forming such spacer moiety may include, for example, allyl glycidyl ether and other epoxy alkenes (e.g., 1,2-epoxy-5-hexene), styrene, halomethyl styrene (e.g., chloromethyl styrene, bromomethyl styrene), allylbenzene, allyl phenyl ether, allylphenol, allyl bromide, allyl chloride, allyl iodide, allyl alcohol, allylamine, 4-allylveratrole, 2-(allyloxy)ethanol, allylisocyanate, N-allyldimethylamine, N-allyldiethylamine, 1-allyl-3,4-dimethoxybenzene, allyl isothiocyanate, allylacetic acid, allylsulfonic acid, vinylacetic acid and polyoxyethylene allyl ether (OE unit 1-3), etc., and in these compounds having no reactive group with an amino group as the functional group other than a vinyl group, the compounds having reactive groups with amino groups introduced by carboxylation, halogenation or sulfonylation of these compounds are included. These groups may also be introduced into the spacer moiety after suitable compounds having vinyl group are bonded to the above silicone polymer. Preferable starting materials may include epoxyalkenes which may also be interrupted with an oxygen atom, such as allylglycidyl ether, 1,2-epoxy-5-hexene.

As the covalent bond at the spacer moiety using the Si—H of the above silica gel coated with the silicone polymer, it may be formed either before or after bonding the polyalkylene polyamine to other bonding groups of the spacer moiety, and generally can include the silicon-carbon covalent bond formed by carrying out the reaction between the vinyl group of the spacer moiety forming starting material and the above Si—H group, according to the method known per se (see Japanese Unexamined Patent Publication (Kokai) No. 63-171678).

The covalent bond between another end of the spacer moiety and the amino group of the polyalkylene polyamine can include the carbon-nitrogen covalent bond or the sulfur-nitrogen covalent bond formed between the epoxy group, halogen atom, carboxyl group or sulfonyl group of the above starting materials and the amino group according to the reaction known per se (as to the reaction scheme, see the above-mentioned published specification).

Further, the term "polyalkylene polyamine" used in the present invention is used in a broad sense, and inclusive of alkyleneamines having two or more amino groups, typically alkylenediamine. These may include one kind selected from the compounds having the formula (IV):

$$H_2N-[(CH_2)_n-NH-]_m-H \qquad (IV)$$

wherein, n represents an integer of 2 to 4, and m represents an integer of 1 to 10, and a mixture thereof. Preferable compounds are those composed mainly of the compound wherein n is 2 and m is 4 to 6. The polyalkylene polyamine, as described above, forms a covalent bond with the functional group of the spacer moiety by use of its amino group to form the packing material of the present invention.

Another embodiment of the present invention is a packing material for liquid chromatography with two or more polyalkylene polyamine moieties existing on substantially the same silica gel portion (particle) of the above packing material being mutually crosslinked. Such crosslinking refers to the state linked with a crosslinking agent per se by use of the amino groups of the polyalkylene polyamine. The linking reaction is formed by the known reaction by use of a crosslinking agent, and specific examples of the crosslinking agent may include aldehydes such as formaldehyde or acetaldehyde or acetals or ketals thereof; dialdehydes such as glutaraldehyde; polyepoxy compounds such as glycerol diglycidyl ether, glycerol triglycidyl ether or ethyleneglycol diglycidyl ether, etc.; dicarboxylic acids such as oxalic acid, succinic acid or adipic acid, etc.; or other polyfunctional compounds such as epichlorohydrin, diisocyanates such as tetramethylene diisocyanate, and so on. The crosslinking mode of these crosslinking agents with the amino group at the polyalkylene polyamine moiety is omitted because it is self-explanatory to those skilled in the art, but one with a crosslinked chain as short as possible is suitable for the object of the present invention, and moreover one which effects crosslinking through a secondary amino group to form a tertiary amino group is particularly preferable. The packing material of the present invention thus obtained is improved in stability under a chemical environment, for example, under alkaline conditions, and also exhibits separation characteristics which enable good separation of various nucleotides for which DEAE type anion exchange resins have been employed in the prior art.

The packing material for liquid chromatography provided by the present invention as described above can be produced advantageously according to the production method which is still another embodiment of the present invention.

First, the porous silica gel coated with a silicone polymer containing a Si—H group prepared according to the method disclosed in Japanese Unexamined Patent Publication (Kokai) No. 63-171678 is allowed to react with a spacer compound having a vinyl group and epoxy group, reactive carboxyl group, reactive sulfonyl group or halogen atom to form a silicon-carbon covalent bond between the Si—H group and vinyl group. The reaction may be carried out after protecting, if necessary, the epoxy group and other reactive groups which are other functional groups, or forming the silicon-carbon covalent bond before introduction of other reactive groups into the spacer moiety. When other functional groups are epoxy groups, by carrying out the reaction under the following conditions, the above bond can be formed while permitting the epoxy groups to remain. That is, it is preferable to carry out the reaction between the porous silica gel coated with a silicone polymer containing a Si—H group and the spacer compound in an inert solvent such as isopropyl alcohol, ethanol or toluene in the presence of a chloroplatinate catalyst at a temperature ranging from room temperature to the boiling point of the solvent used. Although the reaction in a solvent may be preferable, the method of the present invention can also be carried out in gas phase of 300° C. or lower, and the catalyst that can be used, including the above-mentioned catalyst, are platinum group catalysts, such as compounds of ruthenium, rhodium, palladium, osmium, iridium, and platinum, but particularly compounds of palladium and platinum are suitable. The palladium system may include palladium (II) chloride, ammonium chlorotetraamminepalladinate (II), palladium (II) oxide, palladium (II) hydroxide, etc. The platinum system may include platinum chloride (II), tetrachloroplatinic acid (II), platinum (IV) chloride, hexachloroplatinic acid (IV), ammonium hexachloroplatinate (IV), platinum (II) oxide, platinum (II) hydroxide, platinum (IV) dioxide, platinum (IV) oxide, platinum (IV) disulfide, platinum (IV) sulfide, potassium hexachloroplatinate (IV), etc. As an alternative, to these palladium system compounds or platinum system compounds may be added such as tri-n-alkyl (1 to 8 carbon atoms) methylammonium chloride or tri-n-alkylamine to effect ion pair extraction with a water/organic solvent system, and the organic solvent layer obtained can be used. Further, an amine catalyst such as tributylamine, or a polymerization initiator can be used. The above mentioned addition reaction can also be practiced by utilizing UV-ray, $\gamma$-ray, plasma, etc. The bonded amount of the spacer moiety thus introduced can be controlled by choosing the starting materials to be used for silicone polymer coating [e.g., the above formula (I), (II) or (III)] or choosing the reaction time.

Next, the reaction is carried out between another functional group of the spacer moiety, such as an epoxy group, reactive carboxyl group, reactive sulfonyl group or halogen atom (particularly iodine, bromine) and the polyalkylene polyamine. These reactions can be carried out under the reaction conditions known per se, but a further description is provided for the epoxy group. For example, the silica gel coated with a silicone polymer having the above-spacer moiety bonded thereto and the polyalkylene polyamine are dispersed in the same inert solvent as described above, and heated under reflux at the boiling point of the solvent, whereby the carbon-nitrogen covalent bond can be easily formed without a catalyst. The polyalkylene polyamine is required to be in excess over the equivalent amount of the spacer moiety estimated to exist. This amount may change slightly depending on the reaction temperature, etc., but the optimum amount can be easily determined with whether the above silica gel particles are agglomerated or not as the index. The reaction is completed generally within the range of 1 to 10 hours. The term "reactive" as mentioned for the reactive carboxyl group or sulfonyl group means the group such as acid anhydride, etc. to which those groups are derived if necessary prior to the reaction with the polyalkylene polyamine. The reaction with the polyalkylene polyamine through these groups can be also carried out under no catalyst in the same solvent as mentioned above, but if necessary a basic catalyst may be also added to accelerate the reaction. Thus, the packing material for liquid chromatography of one embodiment (sometimes merely called "the first packing material of the present invention") is obtained, and by crosslinking mutually the polyalkylene polyamine moieties existing on these same solid particles, further stability, and new separation characteristics as described above can be imparted. The crosslinking reaction can be also carried out by use of a crosslinking agent known per se according to the reaction methods corresponding to the respective crosslinking agents, to obtain easily the desired packing material. Also in the present reaction, it is necessary to avoid agglomeration between the respective silica gel particles, but the ratio of the first packing material of the present invention and the crosslinking agent which will not cause such agglomeration to occur will very depending on the kind of the crosslinking agent, and therefore is not limitative. Those skilled in the art could determine the optimum ratio by conducting experimentation for the crosslinking agent used. For example, when formaldehyde is used as the crosslinking agent, it is preferable to add equimolar in an amount relative to the total amount of the amino groups and the imino groups existing in the first packing material of the present invention. If it is more than this amount, there is the possibility that crosslinking may occur to effect agglomeration. Also, the reaction conditions differ depending on the kind of the crosslinking agent employed, and therefore the reaction may be carried out similar to the reaction between the primary amino or the secondary amino and various functional groups, such as an epoxy group (or glycidyl group), aldehyde group, carboxyl group or isocyanate group conducted between the respective low molecules. Thus, the second packing material of the present invention (namely, one crosslinked between the polyalkylene polyamine moieties) is obtained.

According to the present invention, there is provided a packing material for liquid chromatography which is stable in operation, particularly stable physically and chemically, and has excellent separation characteristics.

Such effect can be accomplished by coating the silica gel surface with a silicone polymer and linking a polyalkylene polyamine through a spacer to the coating. Particularly, stability is further increased by crosslinking the above polyalkylene polyamine moiety whereby new separation characteristics can be imparted.

The following examples are to illustrate the invention but should not be interpreted as a limitation thereon.

EXAMPLE 1

(Reference)

Silicone Polymer Coating of Silica Gel Particles

Into a rotary system double cone type reactor (made of stainless steel, equipped with a lagging jacket) was charged 10 kg of 5 μm spherical silica gel. The temperatures of the reactor and the tank for feeding treating liquid of 10 liter volume (made of stainless steel, equipped with lagging jacket) directly connected thereto were maintained at 90° C. by feeding a heating medium heated to 90° C. to the respective lagging jackets by a circulation pump from the heat medium heating tank. Into the treatment tank was added 5 kg of tetramethyltetrahydrogen cyclotetrasiloxane, and 2 liter/min. of nitrogen gas was fed into the treating liquid feeding tank to bubble the treating liquid. The reactor is equipped with a condenser, from which nitrogen gas is released so that an unreacted treating agent can be recovered. Also, the reactor was rotated for one minute at intervals of 10 minutes to mix the silica gel within the reactor, and the operation was repeated for 10 hours, and 11.0 kg of the treated powder was taken out. The treated powder exhibited remarkable hydrophobicity.

EXAMPLE 2

(Reference)

Introduction of Spacer Into Silica Cel Coated With Silicone Polymer

An amount 100 g of the silica gel coated with the silicone polymer of Example 1 was placed in an eggplant type flask of 500 ml, and this was heated under reflux in an oil bath at 80° C. for 6 hours 100 ml of allylglycidyl ether and 200 ml of isopropyl alcohol, with 10 mg of chloroplatinic acid as the catalyst, and the mixture was filtered through a glass filter (G-4), further washed with 1000 ml of acetone and dried by degassing to obtain a spacer-introduced silica gel.

EXAMPLE 3

Addition of Ethylenediamine to Spacer

An amount 100 g of the spacer-introduced silica gel obtained in Example 2 was placed in a 1000 ml eggplant type flask, and 200 ml of ethylenediamine and 200 ml of isopropyl alcohol was added as the solvent. The mixture was heated under reflux in an oil bath under stirring for 5 hours, and then filtered with a glass filter (G-4), washed with chloroform and then with methanol, followed by degassing drying to obtain a packing material surface-modified with the polyalkylene polyamine.

An amount 3.3 g of the packing material thus obtained was a slurry filled in a conventional manner into a column made of stainless steel of 4.6 mm in inner diameter and 250 mm in length to prepare a filled column. The present column was connected to a high performance liquid chromatography apparatus, and by passing acetonitrile/water (=75/25) as the mobile phase at a flow rate of 1.0 ml/min., and a sugar mixture was analyzed by use of a column temperature of 40° C. with an RI detector. As a result, the retention times of the respective peaks were as follows (FIG. 1).

| Sample | Retention time |
| --- | --- |
| Fructose | 4.4 min. |
| Glucose | 5.0 |
| Saccharose | 5.7 |
| Maltose | 6.2 |

The present packing material has good stability to hydrolysis owing to the silicone polymer coating, and therefore the column life was longer than that of the chemicaly bonded type NH packing material of the prior art.

EXAMPLE 4

Addition of Pentaethylenehexamine to Spacer

By the addition of pentaethylenehexamine in place of ethylenediamine according to the same method as in Example 3, a packing material surface-modified with the polyamine was obtained.

The packing material thus obtained was filled into a column according to the same method as in Example 3, and sugars were analyzed. As a result, the retention times of the respective peaks were as shown below, exhibiting greater retention abilities than that of the packing material with ethylenediamine of Example 3 (FIG. 2).

| Sample | Retention time |
| --- | --- |
| Fructose | 6.4 min. |
| Glucose | 8.2 |
| Saccharose | 11.4 |
| Maltose | 13.7 |

The present packing material has good stability to hydrolysis owing to the silicone polymer coating, and therefore the column life was longer compared with the chemicaly bonded type $NH_2$ packing material of the prior art.

EXAMPLE 5

Introduction of Spacer Into Silica Gel Coated with Silicone Polymer 100 g of the silica gel coated with the silicone polymer of Example 1 was placed in a 500 ml eggplant type flask, and to this was added 100 g of chloromethyl styrene, 200 ml of toluene and 50 mg of tributylamine chloroplatinate as the catalyst, and the mixture was heated under reflux in an oil bath at 110° C. for 5 hours. The reaction mixture was then filtered through a glass filter (G-4), washed with 500 ml of toluene and 500 ml of acetone, and dried by degassing to obtain spacer-introduced silica gel.

EXAMPLE 6

Addition of Pentaethylenehexamine to Spacer

As described by the above Example 3, pentaethylenehexamine was added to the spacer-introduced silica gel obtained in Example 5 to form a packing material surface- modified with the polyalkylene polyamine.

EXAMPLE 7

Crosslinking of the Polyalkylene Polyamine Moieties 100 g of the packing material surface-modified with the polyalkylene polyamine of Example 4 was placed in a 1000 ml beaker, 250 ml of water and 18.8 ml of 37% formalin solution were added, followed by the addition of 10% aqueous sodium carbonate to adjust 9.0 of pH, and the mixture was stirred at room temperature to crosslink amino groups and/or imino groups. After the reaction, the mixture was filtered through a glass filter (G-4), thoroughly washed with water and methanol, followed by degassing and drying to obtain a packing material surface-modified with the crosslinked polyamine.

The packing material thus obtained was filled into a column according to the same method as in Example 3, and sugars were analyzed. As the result, the retention times of the respective peaks were as shown below, exhibiting slightly smaller retention abilities than the packing material with pentaethylenehexamine of Example 4 (FIG. 3).

| Sample | Retention time |
| --- | --- |
| Fructose | 5.4 min. |
| Glucose | 6.3 |
| Saccharose | 8.0 |
| Maltose | 9.0 |

The present packing material has good stability to hydrolysis owing to the silicone polymer coating, and moreover the polyamine has a crosslinked structure and therefore the column life was longer than those of the polyamine type packing materials of Example 3 and Example 4.

Also, since the present packing material has tertiary amine existing in the crosslinked polyamine, and therefore also had the column characteristics similar to a weak anion exchanger such as the DEAE type packing material.

For example, when nucleotides were analyzed with the present column under the conditions of mobile phase: 50 mM diammonium phosphate (pH 3.0), flow rate: 1.0 ml/min., column temperature: 40° C., detection: UV (260 nm), consequently the retention times of the respective peaks were as follows (FIG. 4).

| Sample | Retention time |
| --- | --- |
| 5' - CMP | 4.0 min. |
| 5' - AMP | 6.4 min. |
| 5' - UMP | 7.7 min. |
| 5' - IMP | 11.8 min. |
| 5' - GMP | 16.5 min. |

Example 8

(Comparison)

An amount 100 g of spherical 5 μm silica gel was dried under reduced pressure at 100° C. for 17 hours. Into a 1000 ml eggplant type flask were added 100 g of dry silica gel, 80 g of glycidoxypropyl trimethoxysilane, 500 ml of dry toluene as the solvent, and the mixture was heated under reflux and stirred to carry out the reaction for 8 hours, whereby a chemicaly bonded type silica gel modified with epoxy groups was obtained. This was subjected to the addition of a polyamine according to the same method as in Example 4 and further crosslinked according to the method in Example 7 to obtain a chemical bonding type silica packing material surface-modified with the crosslinked polyamine. The packing material obtained was filled into a column according to the same method as in Example 3, and sugars were analyzed. As the result, sugars were not substantially retained, but most of them were eluted at around the dead volume.

EXAMPLE 9

Crosslinking of the Polyalkylene Polyamine Moieties

As described in the above Example 7, a packing material surface-modified with the crosslinked polyamine was prepared using 100 g of the packing material obtained in Example 6.

The packing material thus obtained was filled into a column according to the same method as in Example 3, and sugars were analyzed. As a result, the retention times of the respective peaks were as shown below, exhibiting almost same retention abilities than the packing material surface-modified with the crosslinked polyamine according to Example 7.

| Sample | Retention time |
| --- | --- |
| Fructose | 5.0 min. |
| Maltose | 9.0 |
| Saccharose | 8.0 |
| Maltose | 9.0 |

The invention has been described in detail with particular reference to preferred embodiments thereof, but it will be understood that variations and modifications can be effected within the spirit and scope of the invention.

We claim:
1. A packing material for liquid chromatography comprising a moiety derived from a porous silica gel coated with a silicone polymer containing a SiH group, a spacer moiety having two ends and a polyalkylene polyamine portion having an amino group capable of bonding to the spacer moiety, said packing material wherein:
   A. the silicon atom derived from a SiH group of the aforesaid silica gel moiety is silicon-carbon covalently bonded to one end of the spacer moiety, and the other end of the spacer moiety is carbon-nitrogen or sulfur-nitrogen covalently bonded to the amino group of the polyalkylene polyamine; and
   B. the spacer constituting portion between said both bonds is a group having 3 to 15 constituent atoms of a main chain, and comprises a substituted or unsubstituted hydrocarbon chain which is or is not interrupted with at least one oxygen atom, sulfur atom or nitrogen atom.

2. A packing material according to claim 1, wherein the spacer constituting portion is a moiety selected from the group consisting of substituted or unsubstituted alkylene, alkenylene, arylene, alkylene-arylene and dialkylenearyl which are or are not interrupted with at least one oxygen, sulfur or nitrogen atom.

3. A packing material according to claim 1, wherein the spacer moiety is derived from a compound selected from the group consisting of allylglycidyl ether, epoxy alkenes, halomethyl styrenes, allylhalide, allylisocyanate, allylisothiocyanate, allylacetic acid and allylsulfonic acid.

4. A packing material according to claim 1, wherein the polyalkylene polyamine is at least one compound selected from the group consisting of compounds having the formula:

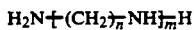

wherein n is an integer of 2 to 4, and m is an integer of 1 to 10.

5. A packing material according to claim 1, wherein the spacer moiety is derived from a compound selected from the group consisting of allylglycidyl ether, 1,2-epoxy-5-hexane and chloromethyl styrene, and the polyalkylene polyamine is at least one compound selected from the group consisting of compounds having the formula:

wherein n is an integer of 2 to 4, and m is an integer of 1 to 10.

6. A packing material for liquid chromatography comprising a packing material which is the packing material of claim 1 crosslinked by a crosslinking agent through two or more amino groups of different polyalkylene polyamine moieties bonded to the same silica gel coated with a silicone polymer.

7. A packing material according to claim 6, wherein a crosslinking agent is a compound selected from the group consisting of formaldehyde, acetoaldehyde, glutaraldehyde, glycerol, diglycidyl ether, ethyleneglycol diglycidyl ether, glycerol triglycidyl ether, oxalic acid, succinic acid, adipic acid, epichlorohydrin and tetramethylene diisocyanate.

8. A packing material according to claim 7, wherein the packing material to be crosslinked is a packing material of wherein the spacer moiety is derived from a compound selected from the group consisting of allylglycidyl ether, 1,2-epoxy-5-hexane and chloromethyl styrene, and the polyalkylene polyamine is at least one compound selected from the group consisting of compounds having the formula:

wherein n is an integer of 2 to 4, and m is an integer of 1 to 10.

9. A packing material according to claim 8, wherein the crosslinking agent is formaldehyde.